Inventor
W. A. E. LOUGHHEAD
By
Cameron, Kerkam & Sutton
Attorneys

Nov. 16, 1965 W. A. E. LOUGHHEAD 3,218,627

ELECTRICAL CODE TRANSLATORS

Filed Jan. 26, 1961 4 Sheets-Sheet 2

Inventor

W. A. E. LOUGHHEAD

By

Cameron, Kerkam & Sutton

Attorneys

Nov. 16, 1965 W. A. E. LOUGHHEAD 3,218,627

ELECTRICAL CODE TRANSLATORS

Filed Jan. 26, 1961 4 Sheets-Sheet 3

Inventor
W. A. E. LOUGHHEAD
By
Cameron, Kerkam & Sutton
Attorneys

Inventor
W. A. E. LOUGHHEAD
By
Cameron, Kerkam & Sutton
Attorneys

United States Patent Office 3,218,627

Patented Nov. 16, 1965

3,218,627
ELECTRICAL CODE TRANSLATORS

William Albert Edward Loughhead, Bramcote Hills, England, assignor to Ericsson Telephones Limited, London, England, a British company Filed Jan. 26, 1961, Ser. No. 85,119
Claims priority, application Great Britain, Feb. 17, 1960, 5,563/60; Aug. 18, 1960, 28,594/60
3 Claims. (Cl. 340—347)

The present invention relates to electrical code translators.

In code translators of a known type a signal applied to any input induces output signals in a corresponding output wire. For example, a known translator may comprise a number of magnetic cores arranged in three rows A, B, and C as shown in FIGURE 1. Each row is shown as having five cores repressenting the number 1 to 5 respectively. A number of input wires may thread different sets of cores in such a way that each of the separate input wires is threaded through any one of the five cores in each row. Thus the application of a signal to an input wire produces output signals corresponding to a three digit number. The translations of the circuit of FIGURE 1 are shown in Table I below.

*Table I*

| Input Terminal | Translation | | |
|---|---|---|---|
| | Row A | Row B | Row C |
| 101 | 1 | 2 | 1 |
| 102 | 3 | 4 | 4 |
| 103 | 2 | 1 | 5 |
| 104 | 5 | 3 | 2 |
| 105 | 4 | 5 | 3 |
| 106 | 2 | 1 | 1 |
| 107 | 2 | 2 | 4 |
| 108 | 5 | 2 | 5 |
| 109 | 4 | 3 | 2 |
| 110 | 1 | 3 | 4 |

Table I shows the way in which the input wires 41–50 of FIGURE 1 are threaded through the cores 1–15. Each of these cores 1–15 has an output coil 21–35.

If a pulse is applied to input wire 41 via terminal 101, a magnetic field will be applied to cores 1, 7 and 11 only. An induced voltage will appear across the output coils 21, 27 and 31, and said induced voltages will be applied via "OR" gates to give simultaneous outputs at I and II. These simultaneous outputs will result in the translation appearing as 12 and not as 121 (see Table I).

According to the present invention there is provided an electrical code translator responsive to the repeated application of an input signal delivered at any one of a number of input terminals to deliver a corresponding translated output signal consisting of one pulse or a succession of pulses each pulse representing a predetermined value, which includes a number of translation units arranged in groups each group containing one unit for each of said predetermined values; a translation conductor connected to each input terminal and threading not more than one translation unit in each of said groups in accordance with the translation values which the output pulses are to represent; an output switch associated with each translation unit; a control device operable to actuate the output switches associated with each group of translation units individually or in any required combination or sequence; and means for synchronising the operation of the control devices with the repeated applications of an input signal.

In this specification, with reference to the input wires the term "threaded through a core" indicates that said input wire passes axially through the core as shown in FIG. 1. It is however possible for the said input wire to be in the form of a coil wound on said core.

It is envisaged that code translators of the type to be described will be used in electronic telephone exchanges and similar apparatus in which some form of memory store, such as a rotating magnetic drum, is used. This store will provide both the recurring input signals and the signals to operate the control devices, and will ensure the correct synchronisation between these signals.

The invention will now be described with reference to FIGURES 1 to 5, in which.

Figure 1:
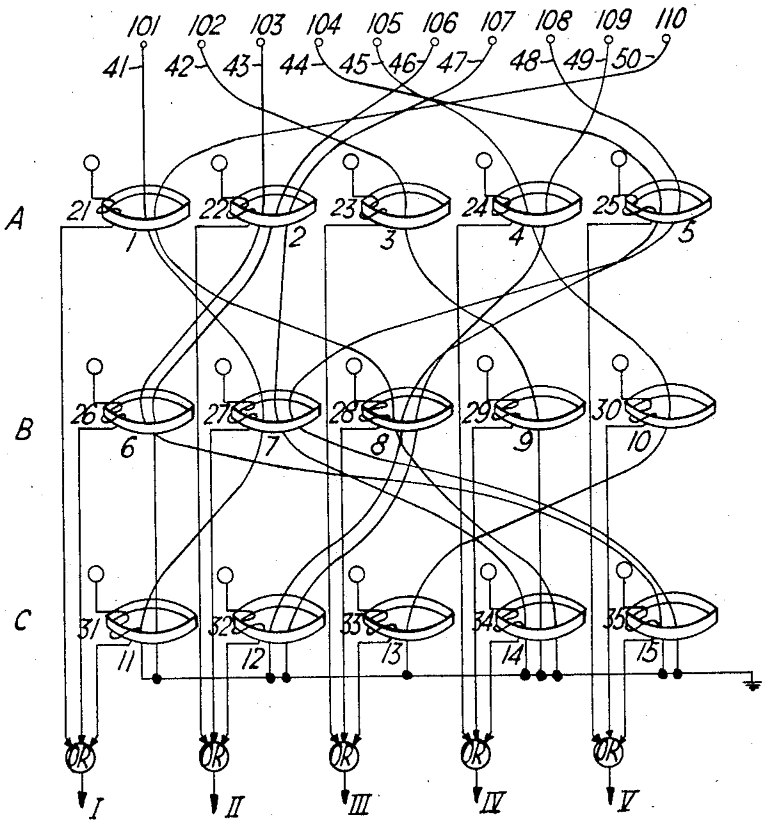
FIGURE 1 shows an example of the prior art.
Figure 2:
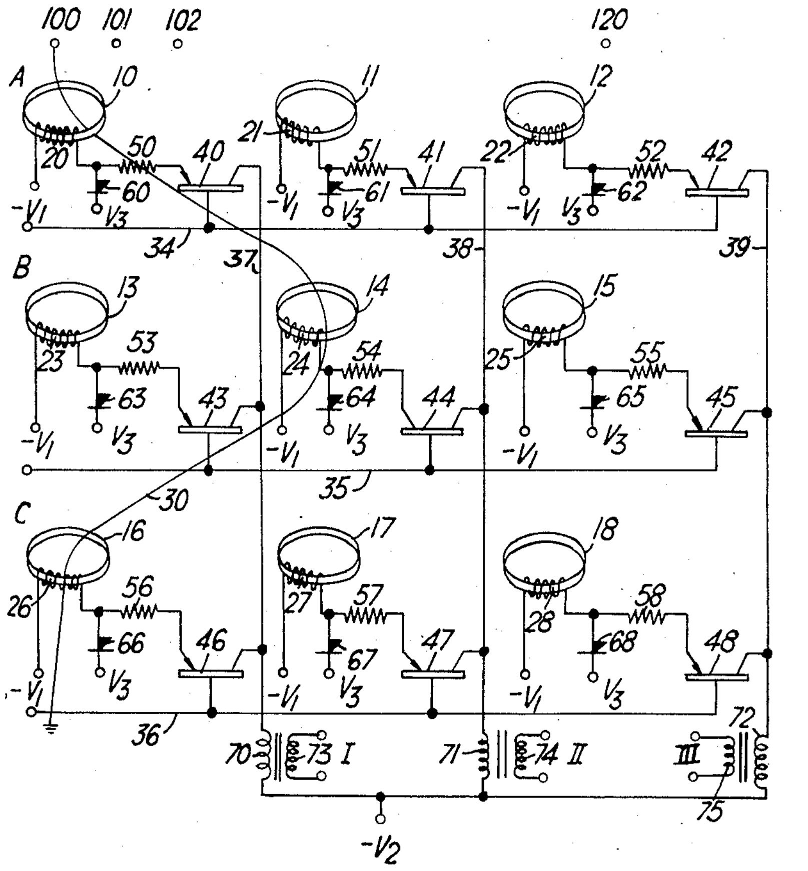
FIGURE 2 shows the arrangement of the translation units and output switches according to one embodiment of the invention.
Figures 3, 4:
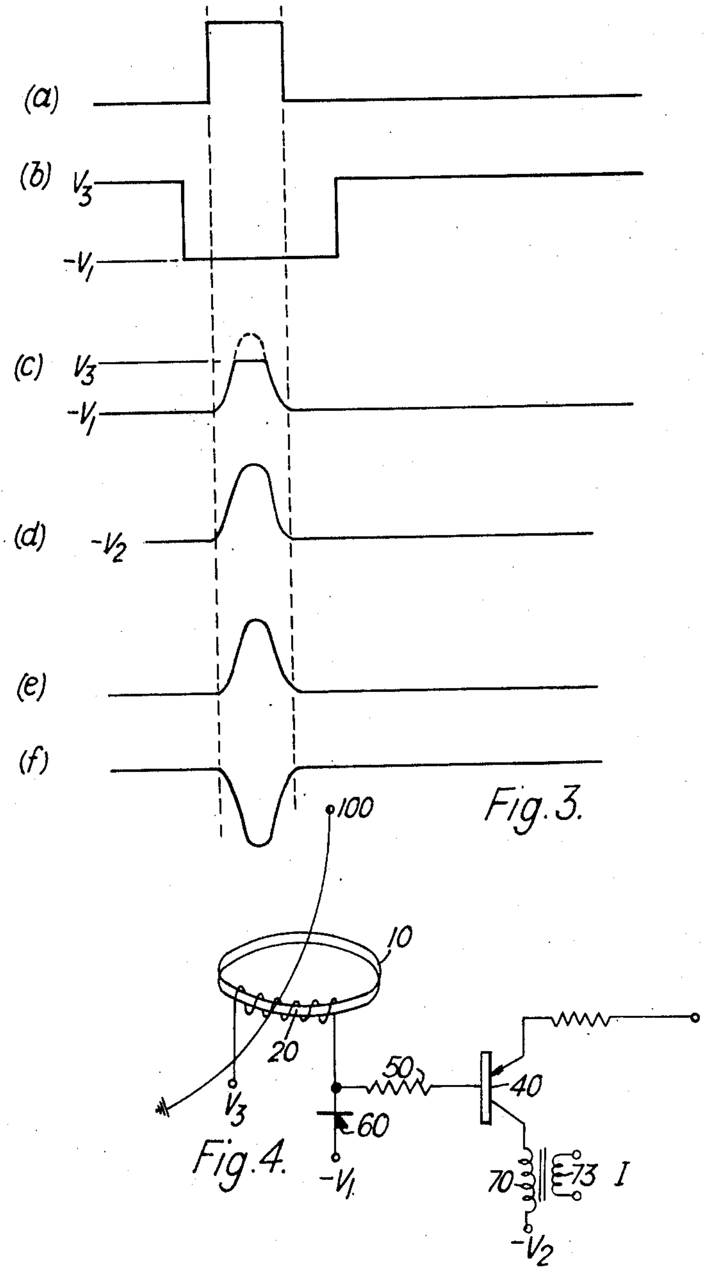
FIGURE 3 shows current pulses which occur during the operation of the circuit of FIGURE 2.
FIGURE 4 shows an alternative form of output switch according to a further embodiment of the invention.
Figure 5:
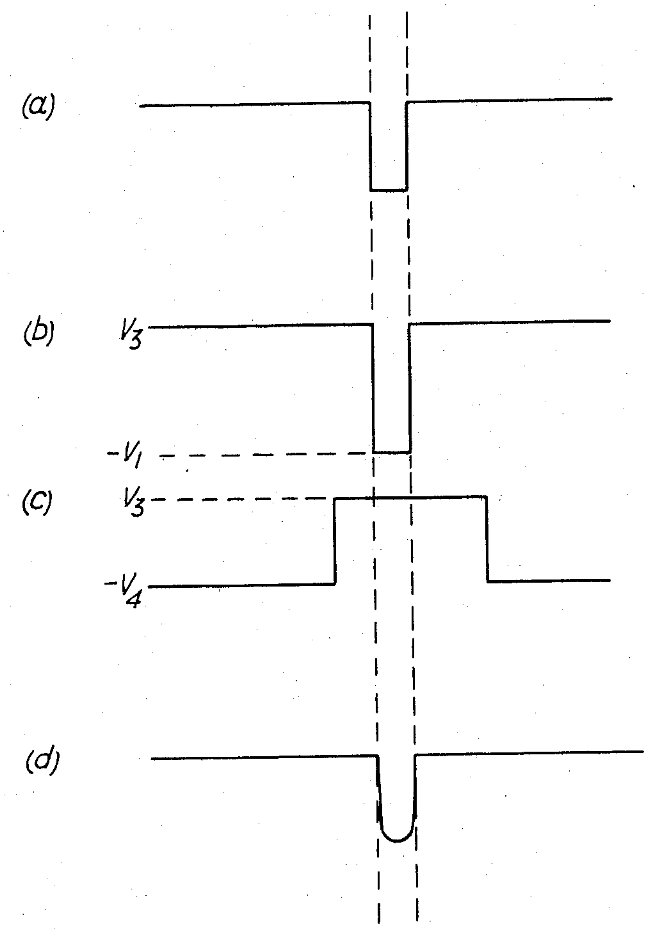
FIGURE 5 shows current pulses which occur during the operation of the circuit of FIGURE 4.

FIGURES 1, 2 and 3 of this specification are identical with FIGURES 1, 2 and 3 of the provisional specification accompanying United Kingdom application No. 5563/60. Similarly FIGURES 4 and 5 of this specification are identical with FIGURES 2 and 3 of the provisional specification accompanying United Kingdom application No. 28,594/60.

Referring now to FIGURE 2 we have three groups, A, B, C, each of three cores 10–18. Each of the cores 10–18 has an output winding 20–28 one end of which is connected to a source of negative potential $-V_1$. The output windings 20–28 are wound such that a positive pulse applied to the input wire 30 produces a positive pulse in the output winding. The other end of each output winding 20–28 is taken to the emitter electrode of a separate transistor 40–48 via an individual resistor 50–58. Connected to the junction between the said resistor and the said winding in each case is the anode of a diode 60–68. The other end of each diode is connected to a potential $V_3$. The base electrodes of said transistors 40–48 are connected to common lines 34, 35, 36 which connect together all the transistor base electrodes in each group. Thus the base electrodes of transistors 40–42 are connected to line 34, those of transistors 43–45 connected to line 35, and those of transistors 46–48 are connected to line 36. These three common lines are normally connected to potential $V_3$ by the external circuit. Similarly the collector electrodes of the transistors are connected to common lines 37, 38, 39 in such a manner that the collector electrodes of all transistors in any vertical column are connected together. Thus the collector electrodes of transistors 40, 43, 46 are connected to line 37, those of transistors 41, 44, 47 to line 38 and those of transistors 42, 45, 48 connected to line 39. Each of these common collector lines is connected to one end of the primary winding of a separate transformer 70–72. The other ends of the primary windings of said transformers are taken to a source of negative potential $-V_2$. Each of said transformers 70–72 has a secondary winding 73–75 from which the output signals are taken.

The one input wire (30) shown is threaded through cores 10, 14 and 16 as shown in FIG. 2. Other input wires can be threaded through other cores in a manner similar to that shown in FIG. 1.

When no input signal is applied to any of the input wires all the transistors are held non-conducting by the relationship between the potentials $-V_1$, $-V_2$ and $V_3$ applied to emitter, collector and base electrodes respectively. These potentials are such that $$|-V_2|>|-V_1|>V_3|$$

The application of a pulse to input wire 30 by way of terminal 100 (FIG. 3*a*) produces a positive pulse (FIG. 3*c*) at the anode ends of diodes 60, 64, 66, these points being the ends of output windings 20, 24 and 26 respectively. The diodes 60, 64, 66 prevent the pulse from rising significantly above $V_3$. If no pulse is applied to lines 34, 35 or 36, no current will flow in any transistor since lines 34, 35, 36 will be at $V_3$. There are thus no output signals from the output windings 73–75.

If a "group demand pulse" (FIG. 3*b*) is applied to Group A by way of line 34 whilst the input pulse is being applied to input terminal 100 then the base electrodes of transistors 40–42 will be taken to $-V_1$, and the positive-going input pulse at the anode of diode 60 (FIG. 3*c*) will drive current into the emitter electrode of transistor 40 through resistor 50. A pulse will appear at the collector electrode of transistor 40 (FIG. 3*d*) which will energize the transformer 70, producing a positive pulse (FIG. 3*e*) or a negative pulse (FIG. 3*f*) across output winding 73, as required. No outputs will occur from transistors 44 or 46 since their base electrodes are at $V_3$. The potential of line 34 returns to earth some short time after the end of the input pulse.

At some later time, still coincident with the input pulse, the group demand pulse is applied to group B by way of line 35, group A and group C being at $V_3$. A positive pulse appears on output winding 24 and drives current through resistor 54 into transistor 44. An output signal appears across winding 74 of transformer 71.

Similarly, at some later time still the group demand pulse can be applied to group C by way of line 36, group A and group B being at $V_3$. In a similar manner an output pulse appears across winding 73 of transformer 70.

In this manner the translation digits 121 will be produced in the correct sequence.

A disadvantage that the system described above has been found to possess is that it imposes a considerable load on the core output winding when current flows through the transistor. The effect of this loading is to reduce the amplitude of the output pulse.

The embodiment described below is designed to overcome this disadvantage.

Referring now to FIGURE 4, an output winding 20 on a core 10 has one end connected to a potential $V_3$. The other end of the output winding is connected through a resistor 50 to the base of a transistor 40. A diode 60 is connected between a potential $-V_1$ and the junction of output winding 20 and resistor 50. The emitter of transistor 40 is connected through a resistor to a source of "demand" pulses, and the collector is connected through the primary winding of a transformer 70 to a potential $-V_2$. The secondary winding of transformer 70 is connected to a pair of output terminals.

When used in a code translator of the type shown in FIGURE 1 the emitter resistors of all transistors associated with any one group of cores are connected together and to a source of "group demand" pulses. Similarly the collectors of all transistors associated with any one output quantity are connected together and to the primary winding of a transformer.

The emitters of the transistors are normally at a potential $-V_4$. On the application of a group demand pulse to a group the emitters of all transistors in that group rise to a potential nearly equal to $V_3$ (FIG. 5*c*).

The applied potentials $-V_1$, $-V_2$, $V_3$, $-V_4$ are such that:

$$|-V_2|>|-V_4|>|-V_1|>|V_3|$$

Consider now the operation of the circuit. The transistor 40 is normally non-conducting since the base is at a positive potential with respect to the emitter. The application of a pulse to an input wire (FIG. 5*a*) produces a magneic field in the core which in turn produces an output pulse across the output winding 20 on the core (FIG. 5*b*). The diode 60 prevents the pulse from falling below potential $-V_1$. This pulse is applied to the base of transistor 40. If no demand pulse is applied to the emitter of the transistor, the transistor remains non-conducting since potential $-V_1$ is more positive than potential $-V_4$.

If a demand pulse (FIG. 5*c*) is applied to the emitter of the transistor whilst the input pulse is applied to the input terminal then the base of the transistor becomes negative with respect to the emitter for the duration of the output pulse. Thus the transistor conducts and current flows through the primary winding of transformer 70 for the duration of the output pulse (FIG. 5*d*).

If a demand pulse is applied to the transistor when no pulse is applied to the base, the transistor remains non-conducting since base and emitter are at the same potential.

The magnitude of the output pulse is limited only by the current limitations on the transistor, and very little loading is imposed on the output winding of the core.

It is obvious from the operation of the above two embodiments that only one input terminal can be pulsed at any one time to give the correct translation. Thus the translation digits may be demanded one at a time irrespective of the number of input terminals, cores, groups and combinations by which the input wires are threaded through the cores.

Negative "spikes" and overshoots are eliminated since the transistors operate unidirectionally. These transistors are active elements and are capable of supplying power to a load.

The cores used may be of any required shape and dimensions, though cores made from a ferro-magnetic material are most frequently used. Any number of cores can be used and the array can be extended into three dimensions.

Although the cores are used in the above embodiments as transformer cores, it is possible to use cores of the type known as "square-loop" cores. In the latter case it would be necessary to provide a "reset" winding on each core.

Although we describe two embodiments using p-n-p transistors, we do not exclude the use of n-p-n transistors in these circuits. It would of course, be necessary to change the polarities of all supply potentials and input pulses.

What is claimed is:

1. An electrical code translator for delivering a translated output signal consisting of one pulse or a succession of pulses each pulse representing a predetermined value, comprising a plurality of input terminals, a plurality of magnetic cores arranged in groups, each group containing one core for each of said predetermined values, each core having an output winding thereon, a translation conductor connected to each input terminal and threading not more than one core in each of said groups in accordance with the translation which the output pulses are to represent, a plurality of group demand lines, and individual switching means associated with each core, each of said switching means including a transistor gate having first, second and third electrodes, the first electrodes of all transistor gates in a group being connected in common to one of the group demand lines, the second electrode of each transistor gate being connected to the output winding of its associated core, and the third electrodes of all transistor gates associated with cores representing the same predetermined value being connected in common to an output terminal, each of said transistor gates being operable in response to the repeated application of an input signal delivered to any one of said input terminals and the coincident application of a synchronized group demand signal delivered at any one of said group demand lines to select the output pulses from each of said groups in turn.

2. An electrical code translator for delivering a translated output signal consisting of one pulse or a succession of pulses each pulse representing a predetermined value, comprising a plurality of input terminals, a plurality of magnetic cores arranged in groups, each group containing one core for each of said predetermined values, each core having an output winding thereon, a translation conductor connected to each input terminal and threading not more than one core in each of said groups in accordance with the translation which the output pulses are to represent, a plurality of group demand lines, and switching means connected to each output winding operable in response to the repeated application of an input signal delivered to any one of said input terminals and the coincident application of a synchronized group demand signal delivered at any one of said group demand lines to select the output pulses from each of said groups in turn, each of said switching means including a transistor having emitter, collector and base electrodes, the emitter electrode of each transistor being connected to the output winding of its associated core, the collector electrodes of all transistors associated with cores representing the same predetermined value being connected in common to an output terminal, and the base electrodes of all transistors in a group being connected in common to one of the group demand lines by a lead individual to said group.

3. An electrical code translator for delivering a translated output signal consisting of one pulse or a succession of pulses each pulse representing a predetermined value, comprising a plurality of input terminals, a plurality of magnetic cores arranged in groups, each group containing one core for each of said predetermined values, each core having an output winding thereon, a translation conductor connected to each input terminal and threading not more than one core in each of said groups in accordance with the translation which the output pulses are to represent, a plurality of group demand lines, and switching means connected to each output winding operable in response to the repeated application of an input signal delivered to any one of said input terminals and the coincident application of a synchronized group demand signal delivered at any one of said group demand lines to select the output pulses from each of said groups in turn, each of said switching means including a transistor having base, collector and emitter electrodes, the base electrode of each transistor being connected to the output winding on its associated core, the collector electrodes of all transistors associated with cores representing the same predetermined value being connected in common to an output terminal, and the emitter electrodes of all transistors in a group being connected in common to one of the group demand lines by a lead individual to such group.

References Cited by the Examiner

UNITED STATES PATENTS

| | | | |
|---|---|---|---|
| 2,840,801 | 6/1958 | Better et al. | 340—174 |
| 2,844,812 | 7/1958 | Auerbach | 340—166 |
| 2,912,677 | 11/1959 | Ashenhirst | 340—166 |
| 2,931,022 | 3/1960 | Triest | 340—347 |
| 2,997,705 | 8/1961 | Freedman | 340—166 |
| 3,130,398 | 4/1964 | Freedman | 340—347 |

MALCOLM A. MORRISON, *Primary Examiner.*

IRVING L. SRAGOW, *Examiner.*